United States Patent [19]
Brown, Jr. et al.

[11] 3,767,553
[45] Oct. 23, 1973

[54] POTASSIUM ION-SPECIFIC MEMBRANE

[75] Inventors: John F. Brown, Jr.; Oliver H. LeBlanc, Jr.; Willard T. Grubb, all of Schenectady, N.Y.

[73] Assignee: General Electric Company, Schenectady, N.Y.

[22] Filed: Oct. 18, 1971

[21] Appl. No.: 190,197

[52] U.S. Cl. ............. 204/195 M, 204/296, 260/824
[51] Int. Cl. .......................................... G01n 27/30
[58] Field of Search ............... 204/195 M, 1 T, 296; 260/824

[56] References Cited
UNITED STATES PATENTS

| | | | |
|---|---|---|---|
| 3,562,129 | 2/1971 | Simon | 204/195 M |
| 3,419,634 | 12/1968 | Vaughn | 260/824 R |
| R24,222 | 9/1956 | Patnode et al. | 204/195 M |
| 3,429,785 | 2/1969 | Ross | 204/1 T |

FOREIGN PATENTS OR APPLICATIONS 1,402,343  5/1965  France ........................... 204/195 M

OTHER PUBLICATIONS

G. A. Rechnitz, C & EN, pp. 146–158, June 12, 1967.
R. A. Durst, "Ion–Selective Electrodes," pp. 89–94, (1969).

*Primary Examiner*—G. L. Kaplan
*Attorney*—Frank L. Neuhauser et al.

[57] ABSTRACT

A potassium ion-specific membrane includes a hydrophobic elastomeric polymer with a dielectric constant of from 4 to 13, and a potassium ion-specific carrier. The hydrophobic elastomeric polymer is preferably an organopolysiloxane polycarbonate block copolymer. The potassium ion-specific carrier is selected from the group consisting of nonactin, gramicidins, valinomycin, and mixtures thereof.

2 Claims, 1 Drawing Figure

PATENTED OCT 23 1973
3,767,553
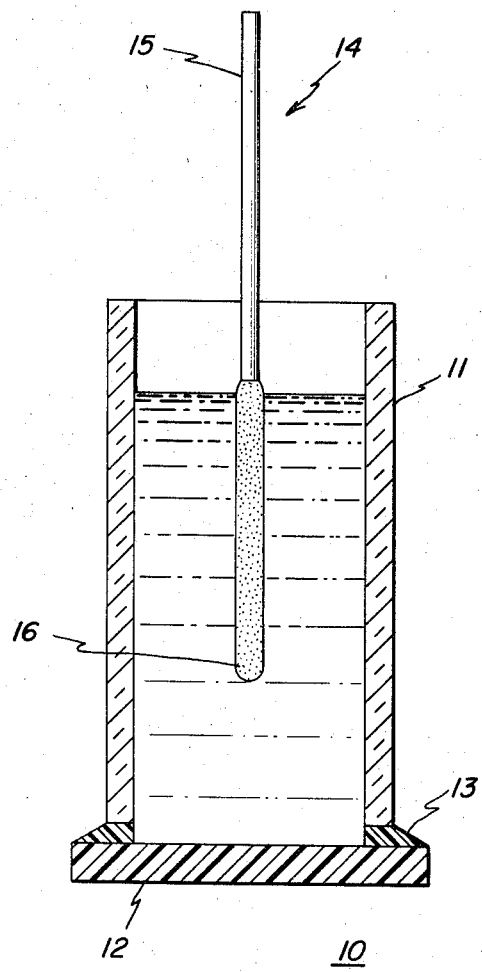
INVENTORS:
JOHN F. BROWN, Jr.;
WILLARD T. GRUBB;
OLIVER H. LeBLANC,
by Paul R. Webb, II
THEIR ATTORNEY

POTASSIUM ION-SPECIFIC MEMBRANE

Reference is made to copending patent application entitled "Ion-Specific Membrane" filed Oct. 18, 1971, and given Ser. No. 190,344, which describes and claims an ion-specific membrane comprising a hydrophobic elastomeric polymer with a dielectric constant of from 4 to 13, and an ion-specific carrier.

This invention relates to potassium ion-specific membranes and, more particularly, to such ion-specific sensing membranes comprising a hydrophobic elastomeric polymer and a potassium ion-specific carrier.

Such ion-specific membranes are employed to measure specific potassium ion responses. These membranes can be used in various types of sensors.

Ion-specific sensors are known in the prior art for measuring the potassium ion activity of a sample. For example, reference is made to U.S. Pat. No. 3,562,129 issued Feb. 9, 1971, entitled "Cation-Specific Electrode System." This patent describes a membrane with an inert material and a cation specific component. The inert material is impregnated with a solution of the cation specific component which is selected from the group consisting of nonactin and its homologues, gramicidin and valinomycin. The membrane can consist of a porous, inactive material, for example, a glass frit, a filter paper or a woven nylon fabric, in which the active component is embedded. Polyethylene and gel formers are also listed as examples. In column 4, lines 18–23, there is described a hot solution of a gel former in a suitable solvent, which is saturated with the cation specific component, and coated on to one side of the polyethylene foil.

Our present invention is directed to an improved potassium ion-specific membrane wherein a hydrophobic elastomeric polymer with a dielectric constant of from 4 to 13, and a potassium ion-specific carrier are mixed together in suitable manner such as in a solution of methylene chloride and cast into a film on a glass plate from the solution.

Organopolysiloxane polycarbonate block copolymers, which are preferred in our present invention as hydrophobic elastomeric polymers, are described and claimed in U.S. Pat. No. 3,419,634 issued Dec. 31, 1968 and assigned to the same assignee as the present application.

Our present invention is directed to an improved potassium ion-specific membrane which is suitable for biomedical, environmental control and other applications.

In accordance with one aspect of our invention, a potassium ion-specific membrane has a mixture of a hydrophobic elastomeric polymer with a dielectric constant of from 4 to 13, and a potassium ion-specific carrier.

These and various other objects, features and advantages of the invention will be better understood from the following description taken in connection with the accompanying drawing in which:

The single FIGURE is a sectional view of a potassium ion-specific electrode employing a potassium ion-selective membrane made in accordance with our invention.

In the single FIGURE of the drawing there is shown generally at 10 a potassium ion-specific electrode employing a potassium ion-specific membrane made in accordance with our invention. A tube 11 of non-ion-selective material, such as glass has a disc 12 of potassium ion-specific membrane sealed to one open end of glass tube 11 by a room temperature sealant 13 holding the edges of disc 12 against the exterior surface of tube 11. A silver wire 14 is positioned partially within tube 11 and extends outwardly from tube 11. Silver wire 14 has a portion of silver wire 15 and a portion 16 with silver chloride thereon. Tube 11 is filled with a buffered saline solution.

We found that we could form an improved potassium ion-specific membrane, which is useful for sensing potassium ions, from a hydrophobic elastomeric polymer with a dielectric constant of from 4 to 13, and a potassium ion-specific carrier. Suitable hydrophobic elastomeric polymers with a dielectric constant of from 4 to 13 include polyurethanes, chloroprene polymers, vinylidene fluoride hexafluoropropylene polymers, and organopolysiloxane polycarbonate block copolymers with a dielectric constant of from 4 to 13. Such block copolymers are described and claimed in the above-identified U.S. Pat. No. 3,419,634. For example suitable block copolymers with a dielectric constant of from 4 to 13 include phenoxysilicon linked cyanoethyl-methyl siloxane/bisphenol-A copolymer, siloxane-carbamate/BPA-carbonate copolymer with diisocyanatosiloxane, siloxane-carbamate/BPA-carbonate copolymer with a ratio of $SiMe_2/SiMeEtCN=3.3$, siloxane-carbamate/BPA-carbonate copolymer with a ratio of $SiMe_2/SiMeEtCN=2.4$, siloxane-carbamate/BPA-carbonate copolymer with a ratio of $SiMe_2/SiMeEtCN=0.13$, and siloxane-carbamate/BPA-carbonate copolymer with a ratio of $SiMe_2/SiMe(EtCN)=13$.

The potassium ion-specific carrier is selected from the group of nonactin, gramicidins, valinomycin, and mixtures thereof. Such carriers are known and described, for example, in the above-identified U.S. Pat. No. 3,562,129. The carriers may be employed in the form of the simple acid or in various admixtures with hydrophobic, lipophilic salts of the acid such as tetraheptyl ammonium salts. Alternatively, the salt forming ion may be structurally incorporated into the polymer to completely prevent its transfer to the aqueous phase. Alternatively neutral hydrophobic, lipophilic salts such as tetraphenyl ammonium-tetraphenyl borate may be added to the polymer. One of the purposes of adding the salt forming species is to increase the conductivity of the membrane and thereby reduce interferences from electrical noise.

The following preparations are suitable to produce organopolysiloxane polycarbonate block copolymers for use in preparing the membranes of our invention:

1. Phenoxysilicon Linked Cyanoethyl-methyl Siloxane/Bisphenol-A Copolymer

A mixture of 15.7 g of pentamethylcyanoethylcyclotrisiloxane (60 mmoles) and 1.3 g of dimethyldichlorosilane (10 mmoles) and 20 mg of ferric trichloride hexahydrate was stirred overnight under anhydrous conditions. An exothermic reaction was observed during the first minutes, accompanied by a strong viscosity increase; the viscosity dropped during later stages of the reaction. The resulting $\alpha,\omega$-dichloropolysiloxane was diluted with 10 cc of anhydrous methylene chloride and added dropwise with stirring under anhydrous conditions to a solution of 6.85 g of bisphenol-A (30 mmoles) and 7.8 cc of dry pyridine in 60 cc of methylene chloride. The mixture was stirred for about 30 minutes after completion of the addition;

phosgene was then slowly passed into the solution until the viscosity rose sharply indicating the end of the reaction. The polymer solution was then washed twice with 10 percent hydrochloric acid and subsequently with water to neutrality. The produce was recovered by precipitation into methanol. A yield of 17.2 g was obtained, 70 percent of the theory. The nmr spectrum shows the presence of 4.7 $CH_3$-Si groups per ethylene; the ratio of siloxane groups to BPA-carbonate units is 1.75, corresponding to 64 wt % siloxane in the copolymer.

Analysis: C—50.8, H—6.8, N—3.2, Si—22.4. Intrinsic viscosity: $\eta = 0.59$ dl/g.

2. Siloxane-carbamate/BPA-carbonate copolymer with diisocyanatosiloxane

A mixture of 44.5 g of octamethylcyclotetrasiloxane, 22.5 g of cyanoethylmethylcyclosiloxane (mixture of tri- to hexasiloxane) and 5.4 g of 1,3-bis (4-aminobutyl)tetramethyldisiloxane was heated with about 20 mg of solid sodium hydroxide under dry nitrogen at 170° overnight. A solution of 14 g of the resulting homogeneous fluid in about 60 cc of dry toluene was saturated with phosgene and then refluxed until all excess phosgene and hydrogen chloride were removed (about 5 hours). Toluene was stripped off, the residue dissolved in about 20 cc of dry methylene chloride and a solution of 5 g of bisphenol-A and 6 cc of dry pyridine in 50 cc of methylene chloride was added at once with stirring. Phosgene was now bubbled slowly into the stirred solution which toward the end of the reaction turned moderately viscous. The workup and recovery of the product were carried out as described in the previous example. A yield of 8 g of polymer was obtained which could be cast into a clear rubbery film from chloroform solution.

3. Siloxane-carbamate/BPA-carbonate Copolymer, Si-$Me_2$/SiMeEtCN=3.3

A mixture of 25 g of octamethylcyclosiloxane (340 mmoles), 8.5 g of cyanoethylmethylcyclosiloxane (mixture of tri- to hexasiloxane; 75 mmoles) and 5.4 g of 1,3-bis(4-aminobutyl)-tetramethyldisiloxane (20 mmoles) was heated at 190° with about 10 mg of sodium hydroxide under nitrogen for 15 hours. A solution of 20.5 g of the resulting homogeneous fluid (10.5 mmoles) and 1.74 g of pyridine (22 mmoles) in about 20 cc of methylene chloride (dried with phosphorous pentoxide) was added over a period of 30 minutes to the stirred solution of 5.6 g of bisphenol-A-bischlorocarbonate (15.9 mmoles) in 20 cc of dry methylene chloride. Stirring was continued for another 30 minutes, then 3.6 g of bisphenol-A (15.8 mmoles) and 5.3 g of pyridine (67 mmoles) was added and a slow stream of phosgene was bubbled into the stirred solution until a sharp rise in the viscosity indicated the end of the reaction. About 10 cc of methanol was quickly added in order to quench the reaction and prevent gel formation. The solution was diluted with about two times the volume of chloroform and washed three times with water. The product was recovered by addition to methanol. A yield of 23 g was obtained.

4. Siloxane-carbamate/BPA-carbonate Copolymer, Si-$Me_2$/SiMeEtCN=2.4

As described in the previous example, an amine-end stopped siloxane fluid was prepared from 22.4 g of dimethylsiloxane cyclic (300 mmoles), 11.3 g methylcyanoethylsiloxane cyclic (100 mmoles), and 5.4 g of bisaminobutyldisiloxane (20 mmoles). As in Example 4, a portion of the product, 19.4 g, was reacted with 5.3 g of BPA-bischlorocarbonate and 1.65 g of pyridine and subsequently with 3.4 g of BPA, 5.0 g of pyridine and phosgene. The reaction product was precipitated by addition to methanol containing about 20 percent of water. A yield of 19.1 g of a tough, colorless rubber was obtained.

5. Siloxane-carbamate/BPA-carbonate Copolymer, Si-$Me_2$/SiMeEtCN=0.13

A solution of 22.4 g of siloxane fluid prepared from 290 mmoles of methylcyanoethylsiloxane cyclic and 20 mmoles of bisaminobutyldisiloxane was reacted with 6.1 g of BPA-bischlorocarbonate and 1.91 g of pyridine, and subsequently with 3.9 g of BPA, 5.8 g of pyridine and phosgene, as described in Example 3. The polymer was recovered by addition to methanol; a yield of 19.5 g of light-tan-colored, tough rubber was obtained.

6. Siloxane-carbamate/BPA-carbonate Copolymer, Si-$Me_2$/SiMe(EtCN)=13

An aminobutyl end-stopped siloxane fluid was prepared by heating 29.5 g of octamethylcyclotetrasiloxane (0.4 mole), 4.0 g of cyanoethylmethylcyclosiloxane (0.035 mole), and 5.4 g of 1,3-bis(4-aminobutyl) tetramethyldisiloxane (0.02 mole) with about 10 mg of sodium hydroxide at 190°C for 15 hours under nitrogen. This fluid was reacted first with 3.24 g of pyridine (0.041 mole) and 10.6 g of BPA-bischlorocarbonate (0.03 mole) in 80 cc methylene chloride. BPA, 6.84 g (0.03 mole), and 10.0 g of pyridine were then added and the resulting mixture was phosgenated as described before. The polymer product was isolated and purified as in earlier examples. A yield of 42 g of a colorless, tough rubber was obtained.

Composition, physical properties, and analytical data for the above copolymers 2–6 are set forth below in Table I.

TABLE I

| No. | Dielectric constant (Σ) | Intrinsic viscosity[c] ($\eta$, dl/g) | Weight percent siloxane in copolymer | Yield (percent)[b] | Molar ratio ($Me_2Si$/Me(EtCN)Si) | | Molar ratio (BPA/Siloxane segment) | | Analysis (found/calc.) | | | |
|---|---|---|---|---|---|---|---|---|---|---|---|---|
| | | | | | Polymer | Starting material | Polymer | Starting material | C | H | N | Si |
| 6 | 4.2±.4 | 0.92 | 60 | 71 | 13 | 12 | 4.8 | 3 | 49.2/49.6 | 7.2/7.5 | 1.8/1.6 | 23.8/22.2 |
| 3 | 5.5±.5 | 1.13 | 63 | 81 | 3.3 | 5.0 | 2.6 | 3 | 50.0/49.8 | 7.0/7.2 | 4.3/3.8 | 22.7/21.4 |
| 4 | 6.1±.6 | 0.78 | 63 | 65 | 2.4 | 3.0 | 2.75 | 3 | 50.6/50.5 | 7.0/7.1 | 5.9/4.3 | 21.6/20.7 |
| 5 | 12±1 | .79 | 62 | 77 | 0.13 | 0.14 | 3.5 | 3 | 55.1/53.6 | 6.5/6.4 | 8.3/8.2 | 16.3/16.5 |
| 2[a] | 5.2±1 | .3 | 52 | 42 | 2.2 | 3.2 | 9.3 | 5.7 | 53.5/54.9 | 6.4/6.6 | 3.7/3.2 | 18.7/17.0 |

[a] Prepared with diisocyanato siloxane II.
[b] Twice-precipitated product.
[c] In $CHCl_3$, 25°.

Examples of potassium ion-specific membranes made in accordance with our invention are as follows:

EXAMPLE 1

A potassium ion-specific membrane was prepared by stirring 3.3 mg. potassium tetraphenylborate with a slight excess of 12.2 mg. valinomycin in 8 ml. methylene chloride until all solids were dissolved. The time required was about three hours. Then 400.4 mg. of siloxane-carbamate/BPA-carbonate copolymer with diisocyanatosiloxane, as described above under Preparation No. 2, was added to and dissolved in the methylene chloride solution. The solution was filtered, its volume reduced until it contained about 7 percent polymer, and a film cast on a glass plate.

A potassium-ion specific electrode was formed by punching out a circular portion of the composition film 0.23 inch in diameter to form a potassium ion-selective membrane and joining it to the end of a glass tube 0.20 inch in diameter with a silicone seal. The tube was filled with an aqueous chloride solution of 141 mM sodium chloride and 4.3 mM. A chlorided silver wire inserted as the internal electrode.

EXAMPLE 2

The assembly of Example 1 was inserted in the solution to be measured along with a fiber-junction saturated calomel reference electrode (S.C.E.). The potential difference between the internal silver electrode and the S.C.E. reference was displayed on a recorder after current amplification. The variable input resistance to the electrometer shunted the electrodes. The active area of the membrane was approximately 0.086 cm$^2$ and the thickness was 0.011 cm. Membrane resistance was measured at $2 \times 10^7$ ohms indicating a resistivity of $1.5 \times 10^8$ ohm·cm for the membrane.

EXAMPLE 3

The above electrode of Example 1 was then life tested by storing it in 100 mM potassium chloride solution. At various intervals the response and resistance have been measured over a period of 10.5 months. After 7,600 hours no change in properties have been noted. The life test is continuing.

EXAMPLE 4

A membrane, which is Example 4, was prepared in the manner set forth above in Example 1 but was not made with a hydrophobic elastomeric polymer with a dielectric constant of from 4 to 13 or with a potassium ion-specific membrane in accordance with the present invention. An organopolysiloxane polycarbonate block copolymer was selected which had a dielectric constant of 2.9, was hydrophobic and elastomeric. A H$^+$ ion carrier that is a hydrophobic, lipophilic uncoupler of p-octadecyloxy-m-chlorophenylhydrazone mesoxalonitrile was employed. However, this membrane, when assembled and tested as described above in Examples 1 and 2 exhibited a resistance of $1 \times 10^{11}$ ohms and gave no response thereby showing its unsuitability as an ion-specific membrane.

While other modifications of the invention and variations thereof which may be employed within the scope of the invention have not been described, the invention is intended to include such as may be embraced within the following claims:

What we claim as new and desire to secure by Letters Patent of the United States is:

1. A potassium ion-specific membrane which comprises a mixture of a hydrophobic elastomeric polymer of an organopolysiloxane polycarbonate block copolymer with a dielectric constant of from 4 to 13, and a potassium ion-specific carrier selected from the group consisting of nonactin, gramicidins, valinomycin, and mixtures thereof.

2. A potassium ion-specific membrane as in claim 1, in which the copolymer is a carbamate-linked cyanoethylmethyl siloxane/bisphenol-A carbonate copolymer.

* * * * *